Patented Dec. 8, 1936

2,063,541

UNITED STATES PATENT OFFICE 2,063,541

PAINT AND VARNISH

Carleton Ellis, Montclair, N. J., assignor to Ellis-Foster Company, a corporation of New Jersey No Drawing. Application December 14, 1931
Serial No. 581,077

25 Claims. (Cl. 134—26)

This invention in its primary phases relates to various compounds, including synthetic acids and their salts, particularly those of ammonium, including compounds not necessarily of an acid character formed by conduct of the diene synthesis to chemically alter various appropriate raw materials and especially certain unsaturated glycerides and/or their free fatty acids or a constituent fatty acid, likewise rosin and other analogous resins, turpentine, and the like; these raw materials being suitably natural products heretofore commonly used in the coating industry for making varnishes, paints, enamels, lacquers, and the like, and which in the form modified by the diene synthesis afford modifications of particular adaptability in the coating field, more particularly for the purpose of producing water paints, varnishes, and so forth.

A diene reaction product is the product resulting from reaction of substances, one at least of which substances contains a conjugated double bond through which the reaction takes place.

The term "maleinized" is utilized herein to cover the diene reaction products obtained by treatment with maleic acid or anhydride, or materials generating such substances, to form a reaction product containing maleic acid or anhydride, or the corresponding group, in combination with the substance treated.

The term "ammonium rosin maleate" or related terminology is intended to cover the ammonium derivative of the rosin-maleic acid diene reaction product.

In carrying out the diene synthesis to fit such natural and/or synthetic products for this purpose a compound preferably of an acidic character containing the group —CO—CH= or similar or similar or analogous reactive group or bodies generating same, including the quinones such as benzoquinone and naphthoquinone, aldehydes such as acrolein and crotonaldehyde, likewise their corresponding acids, maleic and fumaric acids and anhydrides, itaconic and citraconic acids, maleinanilic acid, cinnamic acid, and the like, preferably is employed.

In the following description tung oil and/or its fatty acids will be used to exemplify an unsaturated oil capable of alteration by the foregoing reaction but it should be understood that other analogous reactive raw materials may likewise be employed. These acids (including the oils and fats containing them) are conveniently designated "oil acids" or "fixed oil acids".

Among the natural resins rosin is perhaps the most readily available for the diene synthesis, yielding acids of an especial degree of solubility in a dilute aqueous alkaline vehicle. A specific form of the invention comprises the reaction products of tung oil or analogous oil with rosin or analogous reactive resin, as will be hereinafter exemplified, forming an ammoniated varnish base requiring merely water as a solvent and thinner.

The "diene reagent" which comprises an unsaturated acid (or acids) such as are preferably employed herein, for reaction with the oil acids, generally is one having less than 12 carbon atoms (normally from 3 to 10 carbon atoms) when of the aliphatic series, although they may have a larger number of carbon atoms when of the aromatic or cyclic series. Usually and preferably they are crystallizable. Such initial unsaturated aliphatic acids preferably are polybasic, normally being dibasic or tribasic, including maleic, fumaric, itaconic and citraconic acids, and so forth. An extreme degree of unsaturation is represented by the more unstable acetylene dicarboxylic acids.

Of these acids maleic acid (and its anhydride) which is readily available through methods of oxidation of benzol and the like will be used illustratively herein. Next in order of availability is, perhaps, fumaric acid.

In many cases the anhydrides of such acids or other acid-yielding bodies of an equivalent character are obtainable and in many cases are preferable to the acids themselves. However, in the present application the term "acid" will be considered to comprehend the corresponding anhydride and on the other hand the term "anhydride" will be held to embrace the corresponding acid; all comprehended by the expression acid diene reagent. Mixtures of the foregoing diene reagents may be employed advantageously in many cases; e. g., the employment of a plurality of "diene reagent" acids and/or anhydrides.

While the preferred form of the primary phase of the invention is concerned with the production of an altered rosin or other similarly reactive resin and/or of an altered drying oil of the tung oil type and the utilization of such altered resins and altered tung oil, especially in water-soluble form as later described, in various ways, I wish to call attention to one possible utilization of this altered oil as a raw material in the preparation of a class of resins which are known as "rezyls".

Thus in application, Serial No. 609,136, filed December 26, 1922, Patent No. 1,897,977, granted February 14, 1933, entitled "Artificial resins from glycerol and the like", there are disclosed polyhydric alcohol-polybasic acid condensation products modified by higher fatty acids, and agents accelerating the conversion of the polyhydric alcohol-polybasic acid condensation products into products of decreased solubility and fusibility in which polyhydric alcohol-polybasic acid condensation products acids like maleic and fumaric acids may be utilized, the claims of that application being primarily directed to the polyhydric alcohol organic carboxylic acid condensation products containing materials capable of accelerating the conversion of such products into products of decreased fusibility and solubility. In Serial No. 61,839, filed October 10, 1925, entitled "Resinous products or compositions and process of making same", there are particularly described and claimed products and methods of making same including resinous condensation products of the polyhydric alcohol-polybasic acid type containing vegetable oils, specifically siccative oils, and acids derived from such oils in combination. Among the acids that may be employed in the production of such complexes as disclosed therein, there may be mentioned polyhydric alcohol condensation products, in which the polybasic acid is maleic or fumaric acid, but the condensation products produced with such materials specifically as maleic and fumaric acids are not specifically claimed in that application.

In application, Serial No. 142,532, filed October 18, 1926, for "Coating compositions comprising a souble cellulose compound and a protective agent", there is specifically disclosed and claimed coating compositions, such as nitrocellulose-containing compositions containing protective resins of the polyhydric alcohol-polybasic acid type, including fatty acids of the vegetable oils, particularly the siccative oils in combination in such resin complexes. As disclosed therein, polybasic acids, such as maleic and fumaric acids, may be utilized in the production of those complexes, containing also the polyhydric alcohol, the claims of that application being particularly directed to the coating compositions including film-forming cellulose derivatives, together with the phthalic glyceride type resins. In Serial No. 144,647, fled October 27, 1926, for "Resinous bodies and compositions and process of making same", there is particularly disclosed and claimed resinous condensation products of the polyhydric alcohol-polybasic acid type produced with a heat modified or heat treated fatty acid, the fatty acid thus employed being derived from animal and vegetable oils and fats, including such oils as linseed, tung, soya bean, etc. The examples of that application illustrate the production of the polyhydric alcohol-polybasic acid resins by utilizing phthalic acid or anhydride as the polybasic acid, the disclosure also illustrating the utilization of maleic acid in lieu of phthalic acid in producing those complexes claimed therein. In application, Serial No. 279,216, filed May 19, 1928, for "Products consisting of or containing resins, etc.", there are particularly described and claimed methods of producing polyhydic alcohol-polybasic acid resins, and the resins themselves, in which fatty oils or triglyceride fats or related materials are in chemical combination, the glyceride oils and fats including the drying oils, such as tung oil, being sensitized by treatment with a sensitization agent prior to the resinification reaction. For example, the drying oils may be resinified by first sensitizing them by treatment with either alcohols or organic carboxylic acids, followed by further treatments to produce resins of the polyhydric alcohol-polybasin acid type. Among the polybasic acids utilized as disclosed therein, there may be mentioned phthalic anhydride and other acids, including maleic and fumaric acids. Among the oils that may be treated, there are included tung oil, linseed oil, etc. The claims of that application are particularly directed to the products and methods of producing such products utilizing the sensitized fats or oils in the production of the polyhydric alcohol-polybasic acid resins. In Serial No. 425,711, filed February 3, 1930, for "Water and resin compositions", there are particularly disclosed and claimed polyhydric alcohol-polybasic acid resins in the form of alkali salts soluble in water.

In application, Serial No. 549,334, filed July 7, 1931, entitled "Reaction products and process of making same", there are described and claimed diene reaction products of drying oils or drying oil acids with an acidic compound containing the —CO—C=C group, such as maleic acid or anhydride, salts of such reaction products, aqueous alkaline solutions of such reaction products, and methods of making the same. In application, Serial No. 555,868, filed August 7, 1931, entitled "Diene type reaction product, etc.", there are particularly described and claimed the ammonium salts of the heat reaction products of a drying oil or drying oil acids with an organic compound containing the group —CO—CH=, together with methods of making the same. In application, Serial No. 577,403, filed November 25, 1931, entitled "Products of diene synthesis, etc.", there are particularly described and claimed the diene reaction products of rosin and maleic acid or anhydride, and of rosin and tung oil or tung oil acids with maleic acid or anhydride. In the instant application, there are particularly described and claimed the ammonium derivatives of the diene reaction products of rosin and maleic acid or anhydride, the ammonium derivatives of rosin and tung oil diene reaction products with acids having the —CO—C=C group, other salts of the diene-rosin combinations referred to, aqueous solutions of such salts of the rosin-diene reaction products, and compositions for coating purposes containing any of the diene reaction products referred to, as well as those of a drying oil or drying oil acid with an acidic compound containing the —CO—C=C group, which composition also includes pigments, and which compositions may also include various added components including proteins, cellulose esters, lower alcohols, and plasticizers, together with articles of manufacture carrying a multiplicity of coatings, one of which is a diene type compound of the character described immediately above. In application, Serial No. 612,648, filed May 20, 1932, entitled "Diene resin", there are particularly described and claimed the diene reaction products of natural resins, such as rosin, with acidic compounds containing the —CO—C=C group, specifically the rosin-fumaric diene reaction product, the natural resin ester diene reaction products with such acidic coupling compounds containing the —CO—C=C group, and the polyhydric alcohol derivatives of the named diene reaction products, for example, rosin-maleic glyceride, as well as solutions of the stated products in organic solvents. In application, Serial No. 710,561, filed February 9, 1934, entitled "Varnish bases and process of making same", there are particularly described and claimed reaction products of cashew liquid with alpha-beta unsaturated acids, such as maleic acid, together with such reaction products in compositions with drying oils, and methods of making the same.

Drying oils, if sufficiently well combined, form especially desirable components of resins and other complex products of the present invention. They may be treated by the sensitizing process where the drying oil is first heated with the acid agent before reacting with a polyhydric alcohol to institute resinification.

In the preferred form of the present invention maleic acid or anhydride is employed with rosin and/or drying oil, especially tung oil, to activate the latter by combining therewith, which activated oil may be used as a raw material for the production of resins, but which, in the present application may be used in various other ways, particularly for the production of useful ammonium salts or compounds which are adequately soluble in water, as will be described.

Maleic acid and tung oil as well as the fatty acids of the latter may simply by heating together result in reaction affording an activated tung material serviceable by itself for many purposes and among other utilizations be easily reacted further by treatment with a polyhydric alcohol with or without an added polybasic acid, such as phthalic anhydride, to yield balsams and resins.

One phase of the present invention relates to a diverse series of products which are soluble in dilute aqueous alkaline media.

Aside from increased cost the use in coating compositions of volatile inflammable solvents is objectionable in some cases. Products can be obtained by the present synthesis which are soluble in water containing a volatile alkali, e. g., ammonium hydroxide, and when such a solution is applied as a coating the ammonia escapes leaving a surface finish which is well suited for protective or decorative effects. By using alkali-stable pigments or colors in such solution, cold water paints or stains of various shades may be secured.

The synthesis between the oil acids and the reactive unsaturate of oil alteration may be carried ordinarily merely by heating. Thus, tung oil and maleic acid are heated in a manner suitable to activate or sensitize the oil and greatly increase its acidity, reaction taking place with union of the acid and oil, forming an oil containing acid group which may be regarded as a polybasic acid or anhydride. The locus of coupling with the oil probably is through the conjugated double-bond linkage of the latter, constituting a diene synthesis. Assuming the double bonds at the 9th and 11th carbon atoms of the oil molecule, the opening of the double bond of the maleic group may be expected to form a cyclic body with 6 carbon atoms in the ring, resulting in a derivative of phthalic acid.

The temperature of reaction of this diene synthesis may be varied over quite a range, reaction being slower if the temperature is low. Between 125° and 150° C. some reaction occurs but better results are obtained for most purposes by heating at a temperature above that at which maleic acid becomes the anhydride, or 160° C. and upwards. On the other hand, the maximum temperature to be used in carrying out this reaction when tung oil is the "oil acid" (such acid being in combination as the glyceride) and maleic acid is the reactive crystallizable acid unsaturate, ordinarily does not exceed about 200° C. In the earlier stages of reaction, the range between 150° and 200° C. being suitable, although in some cases higher or lower temperatures may be used. The progress of the reaction may be followed in a rough way by the disappearance of turbidity due to combination of undissolved maleic acid or anhydride. At a temperature near 200° C. this clarification goes on rapidly. Finishing temperatures well above 200° C. frequently are desirable, e. g. 250° or 275° C. The tung polybasic acid anhydride (assuming an adequate proportion of maleic acid has been used) behaves quite differently from the original tung oil, being for one thing, soluble in dilute aqueous alkalies. By proportioning the amount of water, viscous or syrupy solutions result which, as noted, can be applied as coatings; the ammonium compound being, generally speaking, the most suitable. Drying of the coating may be facilitated by baking or stoving the coated article at elevated temperatures. The siccative properties of the tung oil are not altered to such an extent that oxidation-drying is inhibited but baking is recommended for the treatment of metal articles which have had a coating of the aqueous ammoniacal composition in order to fully expel ammonia.

Additions of modifying substances such as aqueous ammoniacal solutions of shellac or rosin or oxidized rosin may be made. Resins of high acidity of the type made from a polyhydric alcohol and a polybasic acid with or without a monobasic acid which are soluble in aqueous alkaline solutions likewise may be incorporated if desired. These compositions likewise may be used as coating, finishing and polishing agents. In addition to simple additions of shellac, rosin, and the like, there may be present compounds of rosin and similar reactive resins with maleic acid or anhydride or the other agents mentioned in the foregoing.

Proteins such as casein or glue also may be introduced as well as gums such as gum arabic, gum acacia and the like.

In a similar manner, starch, soluble starch or flour which have been cooked in water may be incorporated. Pastes, adhesives, paper coating and impregnating material, and the like, may be made with the soluble maleic derivative alone or with such additions. Viscose may be incorporated and the composition used in a similar way. The viscose, e. g. viscose silk, may carry a waterproofing proportion of the water-soluble oil.

Thus the altered oil of water-soluble characteristics as aforesaid may be incorporated with a great variety of water-soluble or emulsifiable materials.

There follow a series of examples which illustrate reaction between the oil acids (free or combined as in glyceride oils) and the reactive unsaturate of oil acid alteration, specifically a reactive crystallizable acid unsaturate such as maleic acid.

*Example 1*

Aqueous ammoniacal solutions of the tung maleic oil complex were tested for compatibility with various water-soluble substances. It was found to be compatible with glue or gelatine, glycerol, ethylene glycol, diethylene glycol or carbitol and the like. Albumin could not be incorporated as readily.

10 parts of the tung maleic oil complex and a like amount of casein, 7 parts concentrated ammonium hydroxide solution and 73 parts water were mixed giving a thick cloudy solution. Applied as a coating the layer dried over night to a clear hard and tough film.

*Example 2*

Solutions were made in dilute ammonia water of (1) congo resin, (2) shellac, and (3) rosin which had been oxidized by gently heating the powdered material in air for some time. These solutions were separately mixed with an ammoniacal aqueous solution of the tung maleic oil complex. Each of the compositions so made gave clear films when dried on glass. The resins increased the hardness of the film over that normal to the oil complex itself.

Similarly mixtures of resin solutions such as a mixture of (1) and (3) or (2) and (3) may be incorporated with the oil complex in various proportions, e. g. 1:1; 1:2; 1:3; 1:4 and in these proportions reversed.

From the maleinized tung oil which to all intents and purposes may be regarded as a polybasic acid there may be formed salts of inorganic bases as well as those of organic bases. Moreover these salts may be neutral, basic or acid. Also one acid group may be neutralized by a water-soluble base, a second acid group by a base forming a water-insoluble salt. One or more of the acid groups may be combined with an oxide of lead, manganese and/or cobalt to secure a self-contained drier, designated an integral drying catalyst.

A salt of such polybasic drying oil whether water-soluble or organic-solvent-soluble may be used to form coatings, air-dried and/or baked on articles of the group of materials comprising metal, wood and paper. The water-soluble maleinized tung oils are proposed for use (among other applications) as a baked coating for covering the interior of tin cans used in the packaging of food stuffs of the canned or "tinned goods" type.

Another quite dissimilar use of the maleinized oil is to treat it with a polyhydric alcohol such as glycerol, as illustrated, to form solid products, e. g. resins and plastics. An intermediate stage of resinification produces balsamic products. Hence the maleinized oil may, in one phase of the invention, be utilized as a polybasic acid providing a raw material for the production of resins of the polybasic acid-polyhydric alcohol type. This means that it may be reacted with glycerol, glycol and the like with or without other polybasic acids such as phthalic anhydride, succinic acid and so forth, further with or without a monobasic acid such as oleic, benzoic, salicylic, stearic, cottonseed fatty acids, linolic, linolenic acids, and the free acids of normal tung oil particularly for the purpose of obtaining resins soluble in organic solvents which may be used as siccative or nonsiccative components of coating compositions, in which the resin may perform the office of the sole binding and film-forming agent or may be used with supplemental film-formers such as nitrocellulose, cellulose acetate and other cellulose esters, ethers and analogous soluble cellulose bodies.

It should be noted that the ammonia used in preparing the ammonium tung-maleate compound exerts a desirable degree of solubility particularly to the extent it combines with the maleic group in the tung complex. If the ammonia combines unduly with the tung acids themselves, that is at the normal carboxyl group of the eleostearic acid or other acids of tung oil containing the conjugated diolefin grouping yielding the diene synthesis or those which do not contain such conjugated diolefin grouping, the resulting soap may prove to be of a character which will tend to act as a thickening agent and thus to increase the viscosity to an undesirable extent for some coating operations. Therefore, the treatment with ammonia should, as far as possible, be such that the gas unites with the carboxyls sufficiently at the locus of diene synthesis rather than with the tung carboxyl itself; all, however, varying with the required use of the product. If the free tung acids are used soaps probably are more easily formed than when the normal glyceride oil is treated with maleic acid. Ammonium tung-maleate, therefore, preferably is made in the manner described reasonably free from ammonium soaps of the fatty acids of tung oil. On the other hand, I may employ the free tung acids or the carboxyl group of said acids as the reaction point for combination of cobalt or other drying agents.

When the ammonium soaps of tung oil do form and cause an increase in viscosity of the coating composition with consequent impairment of brushing qualities, this disturbance may be corrected by the addition of a small amount of an appropriate solvent such as isopropyl alcohol, e. g., a mixture of the pigmented ammonium tung maleate 40 parts, water 30 parts, and isopropyl alcohol 6 parts gives better results than when water alone is used as the solvent vehicle.

Ammonium rosin-maleate, as will be more fully described in the following, is a particularly good corrective for impaired brushing properties of ammonium tung-maleate and also confers quicker drying qualities on coating compositions containing both components.

Example 3

A tung-maleic compound was made by heating 500 parts by weight of tung oil to 175° C. under constant stirring and adding 175 parts maleic acid in a gradual manner until all was dissolved, the temperature meanwhile being kept at 175°C. The temperature then was raised to 200° C. and there were added 2.7 parts litharge, 0.4 part manganese dioxide and 0.4 part cobalt acetate. The temperature was slowly raised to 260° C. and maintained at that point for approximately ½ hour. The driers had not completely dissolved at that point but the excess was removed by filtration. A quantity of the filtered product was placed in a mixer of the Werner-Pfleiderer type which was equipped with a water jacket and water was allowed to circulate therethrough. The stirrer was started and ammonia gas was passed at atmospheric pressure over the mass undergoing agitation. In the course of 2 hours the mass became powdery with very few lumps. This ammoniated material was ground in a ball mill, giving a powder or meal readily soluble in water to give a clear solution.

Example 4

Tung monoglyceride was made by heating 140 parts of the free fatty acids of tung oil and 46 parts glycerol for 1¼ hours at about 345° C. When cold the product was viscous and turbid with an acid number of 17. 30 parts of this product (which probably was a mixture of glycerides) and 40 parts of tung-maleic acid (made in the proportion of 100 parts tung oil to 35 parts maleic acid) were heated to 225° C. and held at that point for a short time. In a few minutes the composition polymerized to an insoluble gel.

Using the same proportion of the reacting materials the following variation was made. The tung-maleic acid was heated to 200° C. and 0.4 part litharge added. The temperature was then raised to 250° C. and practically all the litharge dissolved. After the acid had cooled the tung monoglyceride was added and the mixture heated. At 175° C. the melt became somewhat viscous and on cooling was found to be very rubbery and sticky with an acid number of about 78.

At this stage it was soluble in gasoline, benzol, acetone and in ethyl acetate. A solution was made by dissolving equal parts by weight of this oil-resin in aviation gasoline. The solution was quite viscous. Further addition of gasoline caused precipitation. A clear solution which was free from all stickiness was obtained by the addition of a small amount of a mixture of gasoline and benzol to the 50 per cent solution. This solution showed no precipitation of the drier.

Using 56 parts of the tung monoglyceride to 40 parts of a compound made by reacting on tung acids with 35 per cent maleic acid and heating to 225° C. gave a product which in appearance was a very viscous oil with acid number 105 and soluble in benzol, acetone, ethyl acetate and in aviation gasoline. A clear solution was made by mixing 20 parts of this material with 20 parts aviation gasoline and 5 parts Japan drier. A portion of the melt which was made at 225° C. was heated further and at 240° C. it polymerized to an insoluble gel.

Example 5

Rosin-maleic acid, made with 15 or 20 per cent of maleic acid is not so completely reacted that when treated with aqueous ammonium hydroxide a good clear solution is obtained. A certain amount of unconverted rosin is present which tends to yield soapy, gelatinous, turbid compositions. Even when the maleic acid is increased to 25 per cent based on the weight of the rosin the ammoniacal solution was not entirely clear for the grade of rosin used in this example. On increase to 26 per cent, however, a clear brown solution resulted which in fairly concentrated form had approximately the consistency and appearance of molasses. Therefore in treating rosin with maleic, fumaric or other reactive acid capable of serving as a diene reagent tests should be made to establish the most suitable combining proportions of rosin to the diene reagent to yield a clear solution. As a general rule for most coating purposes, printing inks, and the like, clear solutions are desired.

Rosin 30-maleic acid was dissolved in dilute aqueous ammonia to yield a 40 per cent solution. On drying this yields a glossy coating which is rather brittle and preferably should be plasticized by the addition of castor oil acids, and the like. A pigment such as clay, lithopone, and so forth, may be introduced as required. When the coating is to be very thin as, for example, if the composition is used as a printing ink, the thinness of the layer together with its absorption by the paper or other surface which is to receive the printing is such that the brittleness is not objectionable. Various dyes and pigments may be employed as required for printing ink purposes (e. g., in intaglio ink).

Example 6

75 parts rosin and 25 parts castor oil were heated to 160° C. and 30 parts maleic acid added gradually. Then the temperature was raised to about 250° C. The product was a hard clear resin easily soluble in ammonia.

Example 7

100 parts raw tung oil were heated with an equal amount of W. W. rosin in a receptacle provided with a mechanical stirrer. Carbon dioxide gas was passed over the surface of the melt. The temperature was brought to 175–180° C. then 600 parts maleic acid were added very gradually and when all the acid had been introduced the temperature was raised to 250° C. The flame was withdrawn and the melt poured out into thin layers when the temperature had fallen to about 150° C. When entirely cool the mass was broken up into pieces of about walnut size and charged into a pebble mill. Ammonia gas was then introduced and the ball mill kept in operation while the gassing operation continued until the product was soluble in water to a clear solution. This procedure resulted in a fine voluminous powder which mixed with water in a proportion of, for example, a 30 or 35 per cent solution, yields a clear water varnish.

A considerable proportion of pigment may be added to this powder conveniently introduced into the ball mill. For example, to 1 part of the ammonium tung-rosin-maleate 3 parts by weight of lithopone can be introduced, giving a light colored powder which on the addition of a suitable quantity of water affords a white paint. Made in this way the ammonium tung-rosin-maleate is, as stated, quite voluminous and mixed thus with 3 parts of the lithopone pigment usually will give a paint of desirable consistency by the addition of water equal to its own bulk. To be more specific, if a one gallon paint pail is filled with the powder and water is poured in with stirring the addition of water to bring the liquid level to approximately the level of the original powder suffices to give a paint which for most purposes has a good consistency as, for example, for brushing or spraying. As is often done in the case of ordinary oil paints, the product may, if desired, be filtered through cheese-cloth immediately before use. It may be applied either by brushing, spraying or with coating apparatus. The consistency may be varied simply by the use of a greater or lesser proportion of water. Thus prepared a dry material is available which can be packaged in the dry form and when the consumer wishes to prepare it for application all that is necessary is to add the requisite amount of water, forthwith to apply by brush or sprayer or, if the composition is to be used for coating wallpaper, floor coverings, and other materials, suitable printing or coating apparatus may be employed.

Example 8

50 parts long leaf pine oil and 20 parts maleic acid were heated together with the temperature rising to about 240° C. During this treatment 17 parts of the oil, together with some water, distilled off. Before heating the mixture was light yellow but at about 100° C. the color changed to a dark reddish brown and at the end of the distillation the color was a dark orange.

10 parts of the residue in the distilling flask were heated to 240° C. with 2½ parts glycerol. Reaction took place forming a clear reddish brown balsam.

The remainder of the reaction charge was dissolved in ammonia and a portion not being soluble formed an emulsion. On standing about 5 parts of oil collected at the top and was removed. On acidifying the ammoniacal solution a heavy reddish brown oil settled. This was washed and dried by heating to 150° C. until it became clear. The product had an acid number of 257.

5 parts of this compound and 0.7 part glycerol were heated together to 240° C., yielding a viscous balsam.

The foregoing procedure insofar as it pertains to the formation from pine oil and the like of compounds soluble in dilute ammonia solution is significant with respect to the possibility of converting various unsaturated hydrocarbons of a reactive character into maleic derivatives and thence into their ammonium yielding water soluble bodies available for use in various industrial operations and preparations.

Example 9

Dipping varnishes and dipping paints may be produced from the ammoniacal solutions of the rosin-maleic acid and particularly the tung-rosin-maleic acid which have the advantage of being employed in a water medium and therefore being free from the fire hazard accompanying dipping of articles in large open vats containing varnishes and paints carrying thinners of a volatile inflammable type.

Articles such as penholders, and the like, dipped into a solution of ammoniated tung-rosin-maleic material (33 per cent solution) and allowed to drain yield a smooth uniform and glossy coating (in the present example tung 50 parts, rosin 50 parts, maleic acid 30 parts constituted the reaction mixture yielding the tung-rosin-maleic acid).

A paint was made by employing tung-rosin-maleic acid of the same description which had been treated with ammonia to render it water soluble, this compound being mixed with 3 times its weight of lithopone. Water was then added to obtain a paint of dipping consistency and articles dipped in this composition were given a glossy pigmented surface. In the event foam and froth should appear on the surface of the dipping bath there may be added if desired a small proportion of an alcohol such as isopropyl alcohol or other water miscible volatile solvent reducing surface tension and so forth. The amount of such solvent preferably is small, for example, 10 per cent, in order not to create inflammable conditions.

Example 10

A tung-rosin-maleic ammonium product of a somewhat similar character was prepared and dissolved in water with the addition of a small amount of ammonium hydroxide and about 12 to 15 per cent of casein, based on the tung-rosin-maleic compound. The casein went into solution in the ammoniacal medium and on pouring out this solution on a smooth surface the coating dried to a glossy finish. The viscosity of the solution is, however, increased by the introduction of casein. This, it should be noted, is one objection to cold water paints of the casein type, namely that so small a proportion of the casein binder is present owing to the limitation of viscosity requirement. The addition of sufficient pigment to secure good hiding power does not provide a sufficient amount of casein binder with the consequent objections which have been raised against such coating compositions. The tung-rosin-maleic compound, on the other hand, is so readily soluble in dilute aqueous ammonia that it may be employed to secure a binding effect to the desired complete degree.

Example 11

30 parts corn oil and 12 parts maleic acid were heated to 250° C. and when cold the resulting oil was treated with aqueous ammonium hydroxide solution, yielding a heavy soapy emulsion. From indications resulting from the work under this example the corn oil appears to contain a constituent to the amount of perhaps 10 per cent or thereabouts which is capable of reacting with maleic acid and anhydride. In the treatment of some vegetable oils with maleic acid a certain degree of bleaching has been noticed in some cases.

Example 12

Ammoniation of tung-rosin-maleic acid or tung-maleic acid may be carried out by atomizing the molten mixture with ammonia gas into a chamber where the atomized material will fall through the atmosphere of ammonia to deposit in light powdered form and remain in contact with the ammonia gas for a sufficient length of time to become sufficiently water soluble, the chamber in which the ammoniation is carried out being, if desired, maintained under pressure.

Example 13

The powdered pigmented composition such as that previously described made with 3 parts of lithopone to 1 part of the ammonium tung-rosin-maleate may be compressed under hydraulic pressure to form briquettes. These when preserved in tight containers retain ammonia sufficiently well so that they may be utilized when required to make paint by simply breaking up in water and stirring to a smooth consistency. A pressure of about 300 pounds to the square inch compresses the light and rather voluminous dry paint powder to a briquette of sufficient firmness without compressing to such a density that solution becomes difficult. In like manner paint briquettes can be made from ammonia rosin-maleate and other water soluble bodies described herein. When these briquettes are wrapped in a transparent wrapper, such as Cellophane, and the wrapping well sealed the briquette may be preserved for a considerable time without undue escape of ammonia. By adding the requisite pigments the briquettes may be colored in different shades and the color being visible through the transparent wrapping indicates to the buyer the approximate nature of the pigmentation.

Ammonium tung-rosin-maleate and allied compounds have the very desirable property of retaining sufficient ammonia when properly packaged so that adequate water solubility is instantly at hand. On the other hand the surprising fact is disclosed herein that the ammonia compound does not retain the ammonia persistently when applied as a coating but gives it off gradually to the air with the resultant desired loss in water solubility. Among the advantages in the use of the dry ammoniated compounds are those relating to the marketing of the product, namely, the powdered material is easily packaged with no fear of leakage of liquids, no carrying charges for solvent and avoidance of corrosion of metal containers due to liquids which may become acid. A dry powder can be handled easier than a heavy paste.

Example 14

Reference has been made previously to variations in proportions of tung oil (or its free fatty acids) and rosin. The present example illustrates the effect of departure from a proportion of equal parts of tung oil and rosin frequently mentioned in the foregoing. 600 parts raw tung oil and 400 parts W. W. rosin were melted with stirring, the temperature being raised to 175–180° C. Then 300 parts maleic acid were added gradually. When all the maleic acid was introduced the temperature was raised to 250° C. and then cooled. A viscous sticky mass resulted. This was heated somewhat in order to pour it into a ball mill where it was treated with ammonia gas. In about 4 hours approximately half of the mass had been converted to a fine powder. The remainder was sticky but this was further treated and in about 3 hours more all the material had been converted to a fine powder. To 800 parts of this material 2400 parts lithopone and 1330 parts water were added and ground together to yield a paint composition. This was found to brush nicely on woodwork both over painted and unpainted wood.

Example 15

In the foregoing reference has been made to the peculiarity of the ammonium maleic compounds that they have no undue tendency to soften and lift the undercoat. Tests made with a paint which was composed of 3 parts lithopone to 1 part of ammonium tung-rosin-maleate (tung 50, rosin 50, maleic acid 50) showed that this composition did not disturb a pigmented white enamel, a red enamel and a red lacquer. and that furthermore there was no occurrence of bleeding or impairment of the color of the maleinized composition on applying over these strongly pigmented undercoats.

Methods such as the foregoing permit of refining of the salts of the tricarboxylic acids or other acids obtained by the diene synthesis. For example, rosin which is generally assumed to be a monocarboxylic acid of the anthracene group treated with fumaric or maleic acid would give the corresponding tricarboxylic acid which may be designated rosin maleic tricarboxylic acid or abietic maleic tricarboxylic acid, according to the purity of the product. Likewise tung oil acids treated with fumaric and maleic acids, and the like, will yield what may be designated eleostearic maleic tricarboxylic acid or eleostearic fumaric tricarboxylic acid. On the other hand when made from tung oil the affixation of the maleic or fumaric group may be carried out to form the dicarboxylic acid. Thus a neutral glyceride oil on such treatment yields the tung glyceride maleic dicarboxylic acid or the corresponding fumaric compound, and so forth.

As I have indicated, alkalies do not saponify these products of diene synthesis although they do saponify resins made, for example, in the usual way from polyhydric alcohols and polybasic acids, it being well known for instance that phthalic glyceride and similar resins such as benzoic phthalic glyceride or other resins in which a monobasic acid is employed as a modifying agent will on saponification enable the recovery of the glycerin, phthalic acid and benzoic acid, or whatever may correspond to the composition of the resin. This property of resistance to decomposition by alkalies is one important characteristic of the products of the diene synthesis utilized in this manner for coating purposes, such for example as those classified as varnishes, paints, enamels, lacquers, including nitrocellulose lacquers and others made from cellulose acetate, cellulose ethers, etc., as well as lacquers made without the employment of celulose compounds, and the corresponding water-soluble paints, varnishes, enamels, lacquers, and so forth.

Without going into a discussion herein of this subject matter it suffices to point out that tung oil, tung acids, rosin, and the like, having the conjugated diolefin structure when treated with a polyhydric alcohol, such as glycerol, and a diene reagent, such as maleic anhydride, apparently react preferentially with the latter and with a higher reaction velocity while the slower reaction of esterification with the polyhydric alcohol may follow to give a resin in which the maleic component is very largely united by the diene reaction, so that it cannot be broken down at that point by hydrolysis with dilute alkaline solutions, whereas the esterification conversion is such that the dilute alkali hydrolyzes to liberate the component parts.

In preparing a product for purposes of making a water paint or varnish to contain tung-maleic acid and rosin-maleic acid, and the like, these components may be separately prepared by reaction as individuals with maleic acid or anhydride or the tung oil or the tung acids and rosin may be mixed and heated together with the maleic material and the diene synthesis performed on the several ingredients. For many purposes, however, it is better to make the two components separately and mix them in the proportions desired. In making ammoniated products the tung and rosin compounds may be separately ammoniated or they may be ammoniated in admixture.

An important finding in reference to the ammoniated compounds is that the ammonia is not so firmly bound to these products of diene synthesis that it does not depart readily from a coating when the latter is applied to a surface and quick drying is desired followed by elimination of the ammonia to secure water resistance. It would be expected that a tricarboxylic acid, for example, would retain ammonia persistently and continue to be water-soluble even when exposed as a coating, but the findings are that it is possible for example to wash a coating with water or soap and water after exposure for only a few days or few weeks without impairment of the surface (the length of time of exposure before ammonia has departed sufficiently to secure water resistance will depend somewhat upon the composition and on the temperature conditions, humidity, and so forth, at the time of application).

I have already referred to the possibility of painting or varnishing on a wet surface and this it will be found is advantageous especially when the job in hand is an outside one and the walls of the building are wet from storms. On the other hand in a new building with freshly plastered surfaces it is advantageous to be able to paint the walls quickly.

While the illustrations given herein to a very considerable extent refer to the diene synthesis carried out with the aid of maleic acid and anhydride, it of course is understood that various other diene reagents are applicable in like manner, as has already been indicated. and which can be further elucidated by the following table which shows the effect of heat treating ordinary rosin with different acid bodies either unsaturated or capable of becoming unsaturated on heating:

| 100 parts W. W. rosin treated with acids | Temperature | Softening point | Acid No. |
|---|---|---|---|
| | | ° C. | |
| Malic—15 | 270° C | 113 | 258.7 |
| Malic—30 | 270° C | 123 | 316.9 |
| Citric—15 | To 205°/25 min | 95 | 205.3 |
| Citric—30 | To 205°/30 min | 101 | 232.2 |
| Fumaric—15 | To 230°/25 min | 128 | 263.1 |
| Fumaric—30 | To 230°/35 min | 145 | 332.6 |
| Maleic—15 | 240° C | 112 | 267 |
| Maleic—30 | 240° C | 131 | 342.7 |
| Rosin | 205°/30 min | 88 | 167.7 |
| Rosin | Raw | 82 | 161.5 |

The rosin employed was W. W. of softening point 82° C. and on heating to 205° C. without other agent being present the softening point was raised to 88° C. with some darkening. Using 100 parts of this W. W. rosin heating was carried out at the temperature specified in the above table, using the acids listed in the left hand column and in the proportion in parts by weight as indicated. The third column refers to softening point of the products of the diene synthesis from which it will be noted that very much harder resins are obtained by treatment of ordinary rosin in this manner. The fourth column gives the acid numbers of the various products and it will be noted from this column that the acidity is substantially increased as the rosin becomes converted to an acid having a larger number of carboxylic groups or corresponding anhydride groups. In this connection I wish to point out that especially for treatment with ammonia to make water soluble products these high acid resins of acid number 200 to 300 and upwards are desirable. They also have an important utility in the production of resins of various properties of hardness, flexibility and other qualities during reaction with suitable polyhydric alcohols.

What I claim is:

1. A varnish agent containing a water-soluble salt of the reaction products of ammonium rosin and maleic acid.

2. A varnish agent containing a water-soluble salt of the reaction products of ammonium tung oil rosin and maleic acid.

3. A varnish agent containing a water-soluble salt of the reaction products of ammonium tung acid rosin and maleic anhydride.

4. A composition according to claim 1 in finely divided form carrying a dry pulverulent pigment.

5. A composition according to claim 2 in finely divided form carrying a dry pulverulent pigment.

6. A composition containing an aqueous solution containing the reaction product of an acidic compound containing the —CO—C=C— group and an unsaturated organic compound, and a pigment.

7. A coating composition containing water and the reaction product of an acidic compound containing the —CO—C=C— group and an unsaturated oil, and a pigment, said composition yielding on drying, a drying oil type coating.

8. A coating composition containing water and the reaction product of an acidic compound containing the —CO—C=C— group and a terpine compound, said composition yielding on drying, a varnish type coating.

9. A coating composition containing water and the reaction product of an acidic compound containing the —CO—C=C— group and an unsaturated oil, and the reaction product of an acidic compound containing the —CO—C=C— group and a rosin, said composition yielding on drying, a varn'sh type coating.

10. A composition containing a solution of an alkaline salt of the reaction product of an unsaturated oil and an acidic compound containing the —CO—C=C— group and a protein, the components being present in proportions to yield a hard tough coating on drying.

11. A composition containing a solvent and the reaction product of an unsaturated organic compound with an acidic compound containing the —CO—C=C— group, together with a cellulose ester, the components being present in proportions to yield a clear film on drying.

12. A coating composition containing a solution of the reaction product of an unsaturated organic compound with an acidic compound containing the —CO—C=C— group, and a lower alcohol, the components being present in proportions to prevent crawling in coatings formed by drying said composition.

13. A coating composition containing a solution of the reaction product of an unsaturated organic compoud with an acidic compound containing the —CO—C=C— group, and a plasticizer, in proportions to yield a flexibilized coating upon drying.

14. An article of manufacture carrying a multiplicity of coatings, one of wihch coatings is a primer coating containing the reaction product of an unsaturated organic compound with an acidic compound containing the —CO—C=C— group.

15. An article of manufacture carrying a multiplicity of coatings, one of which is an undercoat of the drying oil type, carrying a superposed coat of the reaction product of an unsaturated oil with an acidic compound containing the —CO—C=C— group.

16. A coating composition containing a salt of the reaction product of a natural resin with a compound containing the —CO—C=C— group.

17. A salt of the reaction product of a natural res'n with an unsaturated oil and a compound containing the —CO—C=C— group.

18. A coating composition containing an aqueous alkaline solution of the reaction product of a natural resin with a compound containing the —CO—C=C— group.

19. A coating composition containing an aqueous alkaline solution of the reaction product of a natural resin with an unsaturated oil and a compound containing the —CO—C=C— group.

20. A composition adapted for use in the preparation of paints, lacquers and coating compositions comprising the reaction product of an unsaturated organic compound with an acidic compound containing the —CO—C=C— group, and a pigment.

21. A composition adapted for use in the preparation of paints, lacquers and coating compositions comprising the reaction product of a drying oil and an acidic compound containing the —CO—C=C— group, and a pigment.

22. A briquette adapted for solution in a solvent to produce a coating composition, said briquette including the reaction product of an unsaturated organic compound with an acidic compound conta:ning the —CO—C=C— group.

23. A briquette adapted for solution in a solvent to produce a coating composition, said briquette including the reaction product of a drying oil with an acidic compound containing the —CO—C=C— group, and a pigment.

24. A briquette adapted for solution in a solvent to produce a coating composition, said briquette including the ammonium salt of the reaction product of rosin and maleic acid, together with a pigment.

25. A briquette adapted for solution in a solvent to produce a coating composition, said briquette including the ammonium salt of the reaction product of tung oil with maleic acid, and including a pigment.

CARLETON ELLIS.